United States Patent [19]

Järvinen

[11] 4,403,219

[45] Sep. 6, 1983

[54] DIFFERENTIAL CAPACITIVE POSITION INDICATOR

[75] Inventor: Pauli Järvinen, Vantaa, Finland

[73] Assignee: Eflab Oy, Finland

[21] Appl. No.: 275,244

[22] Filed: Jun. 19, 1981

[30] Foreign Application Priority Data

Jul. 11, 1980 [FI] Finland ............................... 802222

[51] Int. Cl.³ ........................................... G08C 21/00
[52] U.S. Cl. ............................. 340/870.37; 324/61 R; 340/686
[58] Field of Search ........... 340/870.37, 870.3, 870.16, 340/686; 324/71.1, 61 R

[56] References Cited

U.S. PATENT DOCUMENTS

| | | | |
|---|---|---|---|
| 2,948,890 | 8/1960 | Barth et al. | 340/686 |
| 3,340,400 | 9/1967 | Quittner | 324/61 R |
| 3,702,957 | 11/1972 | Wolfendale | 324/61 R |
| 3,815,021 | 6/1974 | Kerr | 324/61 R |
| 3,938,113 | 2/1976 | Dobson et al. | 340/870.37 |

Primary Examiner—Glen R. Swann, III

Attorney, Agent, or Firm—Hopgood, Calimafde, Kalil, Blaustein & Judlowe

[57] ABSTRACT

An oscillator operating within the frequency and with the wave shape selected for the operation of the device cooperates with transmitter strips of a length of the desired distance of indication of the movement and formed, e.g., in the way of printed circuits as connected to the said oscillator, as well as corresponding receiver strips as connected to a differential amplifier, e.g. to the amplifier of an integrated circuit. Hereinafter it is possible, by means of the indicator, to indicate a connecting together of the transmitter strips and the receiver strips by means of mobile plates placed on the device whose position is supposed to be indicated. According to the invention, the transmitter strips and the receiver strips are formed in such a way in pairs that the mobile plates, when placed on one side of the indication point, connect a certain one of the transmitter strips with a certain one of the receiver strips but, after the mobile plates have moved to the other side of the indication point, this connection has become opposite.

4 Claims, 2 Drawing Figures

DIFFERENTIAL CAPACITIVE POSITION INDICATOR

BACKGROUND AND SUMMARY OF THE INVENTION

The present invention is concerned with indicators of position which indicate the location of a device as a non-continuous quantity by making use of the capacitance. By means of the device, it is possible to indicate the magnitude of a shifting or the position of the device at the desired precision, which precision is selected in advance when the device is manufactured. The solution is particularly favourable when, out of some reason, it is expressly undesirable to pass conductors to the mobile part of the device and when it is also undesirable to use solutions otherwise known, e.g. optical solutions.

A number of different devices have been developed by means of which the shifting of a certain part mechanically can be converted into a quantity expressing the position, which quantity is usually desired as an electrical quantity. Devices of this type can be implemented by making use of different phenomena, e.g. as resistive, inductive, capacitive, optical, etc. As a rule, a common feature of these solutions is the use of an appropriate raster-type image, which is, by making use of the phenomenon mentioned above, converted so as to express the location or movement of a mobile device. The form of this raster is coded in an appropriate way, and even several different means are in themselves known for performing this coding, e.g. Gray code, BCD code, or any other, equivalent. The density of the code determines the precision with which the position or movement is then expressed.

When an optical code reading is used, the medium must, of course, be suitable for the passage of the optical beam of light. On the other hand, it is easy to achieve the desired precision. Instead, when a resistive or inductive indication is used, it is clearly more demanding to achieve the desired precision, as was already stated above. Likewise, in the resistive case, direct contact with the mobile part is usually necessary.

Now it has been noticed according to the present invention that, when the capacitive principle of expression is used, highly remarkable precision and essential independence from environmental circumstances can be achieved by proceeding in the way more closely defined in claim 1. In the other attached patent claims, particular embodiments of the case of the attached claim 1 are defined.

BRIEF DESCRIPTION OF THE DRAWINGS

The particular advantages obtainable by means of the present invention, for example independence from the environment, can be understood more readily by reading the following description of a preferred embodiment of the invention.

This is a case of application of the indicator of the position of a measurement device that performs the measurement of several samples, which is illustrated in FIG. 1.

DESCRIPTION OF THE PREFERRED EMBODIMENTS

Figure 1:
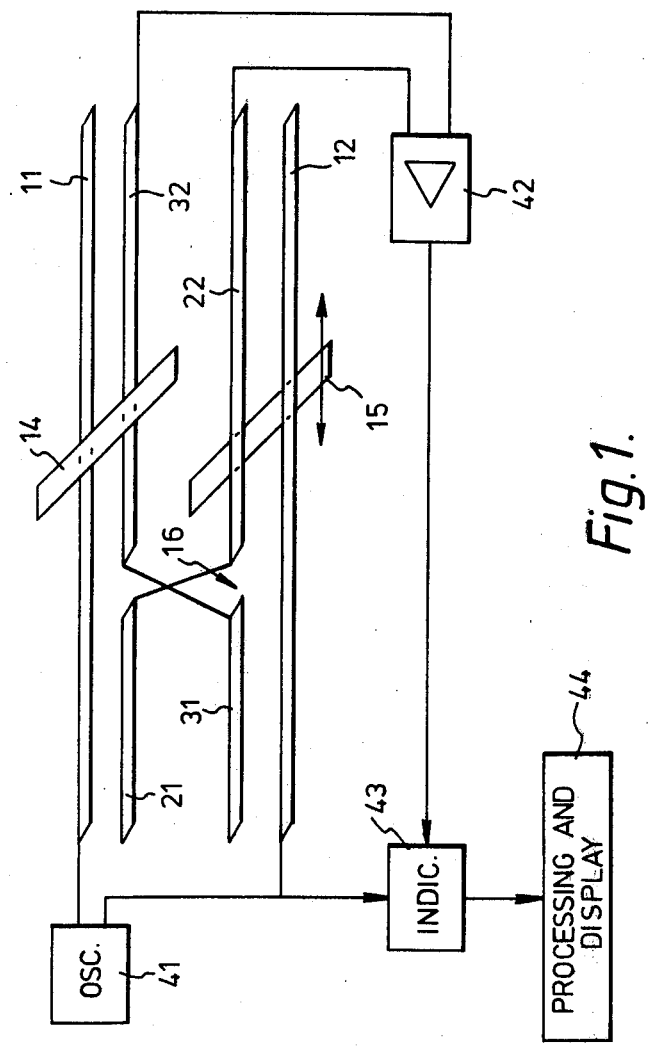

As the indication is based on capacitive operation, the first component of the electrical circuit of the device is an oscillator 41, by which the operating frequency of the device is selected. This oscillator brings the frequency that it produces to the so-called transmitter strips 11 and 12, whose position in relation to the other strips in the device will be described later. The voltages of the oscillator are introduced to the transmitter strips as of opposite phases, so that the sum of these voltages at each particular time in relation to the earth (frame) is as constant as possible. In addition to this, the equipment is provided with so-called receiver strips 21, 22 and 31, 32, likewise placed "stationary" in relation to the transmitter strips, and either one of these, either the transmitter strips or the receiver strips, are placed, in the way to be described later, as "coded" so that the position can then be read from there unambiguously. Thus, in the theoretical case of one pair of transmitter strips and one pair of receiver strips, it does not matter which of the strips is coded, but in practice one usually wishes to use one pair of transmitter strips and several receiver strips as connected to the codes of different positions of indication in order that the position could be indicated with the desired precision, i.e. not only as a two-position indication formed by one exchange point. Then, of course, the transmitter strips are straight and the receiver strips are coded so as to produce the indication concerned.

The transmitter strips and the receiver strips are placed as stationary in relation to each other, e.g., in the same part so that they are not in themselves connected with each other but that they can be connected by using extra, mobile second plates 14 and 15 of a pair of capacitors. The connection thereby passes from the transmitter strips (e.g. 11) to the capacitors of the mobile plates (e.g. 14) and then from the mobile plates (e.g. 14) again to the receiver strips (e.g. 32) by the intermediate of the second pair of capacitors. When the mode of formation of the capacitors to be described in more detail below is used, the connection is very tight.

The mobile plates 14 and 15 do, thus, not require any particular source of current, and they can be placed on the mobile part of the measurement device, and in accordance with the position of the mobile plate in relation to the receiver strips, they produce a connection at this point of the series of receiver strips. Since the structure of the strips is coded, the indication is thereby changed in accordance with the location of the mobile plates.

The receiver strips are then connected to a differential amplifier 42, which is of standard construction and, consequently, in itself known, e.g., integrated circuit components being known as such amplifiers. The input of the differential amplifier is preferably current-controlled (Zin=0), because in this way the input impedance of the amplifier short-circuits the possibly differential stray capacitance of the receiver strips, and since there is no signal voltage in the receiver strips, this gives the advantage that the capacitance of any conductive objects placed in the proximity of the strips concerned does not cause a shifting of the location to be identified. The signals of the differential amplifier 42 and of the oscillator 41 can now be passed into the indicator 43, which gives a positive or negative voltage as the output, depending on which of the transmitter strips is connected to which of the receiver strips by means of the position of the mobile plates at that particular time.

Figure 2:
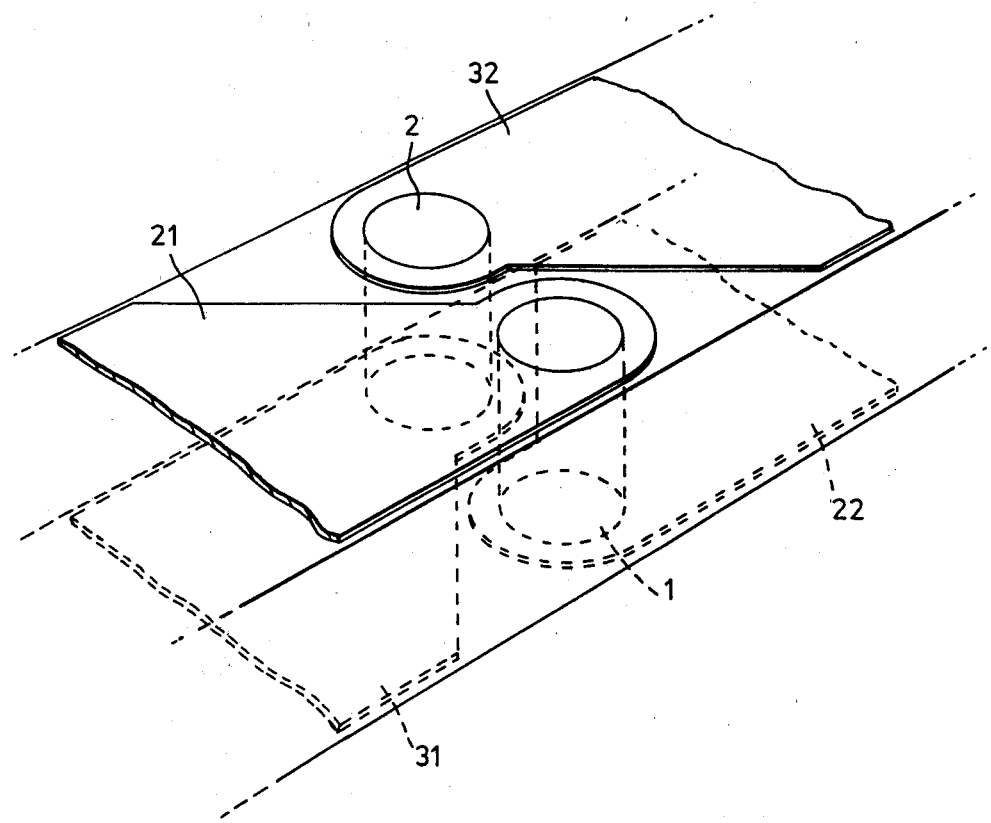
FIG. 2 shows an exchange point on a receiver strip, accomplished by means of the printed-circuit technique.

Thus, as was stated above, each pair of the mobile plates connects either one of the transmitter strips to either one of the receiver strips. Depending on their coding, the receiver strips vary their locations so that, when the mobile plates move beyond the transition point 16, the connection from the transmitter strips becomes inverted on the receiver strips. By means of the so-called printed-circuit technique, it is possible to apply electrically conductive foils onto the surface of an electrically insulating sheet (e.g., fibreglass epoxy), by means of which foils it is possible to accomplish a electrical connection between components, while the insulating frame sheet functions as the mechanical fixing base. The shape and quantity of the foil patterns do not affect the production cost of the sheet. (The cost of the sheet is mainly affected by the area, one or two sides, and number of holes.). It is advantageous to use the said technique in order to accomplish this indicator of position, because the dimensional precisions and particular shapes of conductors can thereby be achieved easily (FIG. 2). As a rule, an indicator of this type is needed in connection with an apparatus which involves a great deal of other electronics. The indicator can be designed at the edge of the electronics plate proper. In this way, almost all expenses of mechanical installation and of electrical connection can be avoided. Besides the circuit strip, the device of course requires as mechanical parts only a runner which contains two insulated electrically conductive strips (e.g., tinfoil paper).

This solution for connecting the receiver strips alternatingly to different transmitter strips can be accomplished particularly easily by, in accordance with this embodiment, using a two-sided capacitive part resembling a printed circuit, whereby the transmitter strips are placed on different sides of the printed circuit plate, being all the time placed on one side of it, but the receiver strips are connected so that the part of the plate (e.g. 31) that was always "underneath" the plate until the transition point 16 is after the transition point now connected to the capacitive surface (e.g. 32) placed "above" the circuit plate. When the mobile plates are corresponding narrow capacitive strips 14 and 15 of appropriate size, which are almost in contact with the transmitter strip 11/12 and likewise "in contact" with the receiver strips 21/31 or 32/22, the connection is determined from the mobile plates to the receiver strip parts placed either "above" the plate or "underneath" the circuit plate. In FIG. 2 the strips 21 and 22 placed on different sides of the plate are connected with each other by means of copper plating in the hole 1. In the corresponding way, the strips 31 and 32 placed on different sides are connected with each other by means of copper plating in the hole 2. The strips 21 and 32 are placed on one side of the plate and the strips 22 and 31 on the other side.

Since the number of the pairs of receiver strips and the corresponding number of differential amplifiers and of indicators had right from the beginning been selected in view of the desired length of indication of the movement and of the desired precision of indication, for the arrangement of the exchange points the code criterion is used that was at each particular time chosen for accomplishing the indication. Thus, in accordance with the known nature of the code, there is a series of capacitors for receiver strips that shifts from one side of the connection plate to the other at each desired point of indication, i.e. at the spacing that was selected as the precision. Some other pair of receiver strips changes the side on the connection plate only at half the frequency mentioned above, i.e. the lengths of the receiver strips on both sides of the connection plate are double as compared with the above. In addition to this, there are then pairs of receiver strips using four-fold, eight-fold, etc. length, as compared with the basic length, while the transition points are changed in accordance with the selected code.

The measurement strips and the runner form a symmetric capacitor combination between the output of the oscillator 41 and the input poles of one of the differential amplifiers 42 of the receiver strips. The reversing of the sense of the indication takes place when the mobile strips are in the middle of the exchange point 16 of the receiver strips. The capacitive connection produced by means of the mobile strips is in balance at the exchange point within a very short distance, because the amplification of the amplifiers can be made very high in practice. Then the polarity of the signed of the indication is changed very rapidly when the mobile runner moves, and the location is indicated precisely by means of the coded output voltage.

The rectangular-wave shaped digital signed obtained in this way is then used, by means in themselves known, in subsequent parts 44 of the equipment.

Thus, a preferred embodiment of the present invention has now been described, which embodiment can be varied in any desired way within the scope of the attached patent claims.

What is claimed is:

1. A capacitive position indicating device comprising:
   (a) oscillator means for providing an AC voltage;
   (b) first and second spaced transmitter strips connected to said oscillator means;
   (c) first and second receiver strips, each of said first and second receiver strips having first and second sections, said first and second sections being electrically connected, said first section of first receiver strip being disposed proximate to said first transmitter strip, said second section of said first strip being disposed proximate said second transmitter strip, said first section of said second receiver strip being disposed proximate to said second transmitter strip, said second section of said second receiver strip being disposed proximate to said first transmitter strip, the point at which said first and second sections of said first and second receiver strips are connected forming an indicator point;
   (d) a differential amplifier connected to said first and second receiver strips;
   (e) first and second mobile plates moveably disposed on said device, said first mobile plate being disposed proximate to and alternatively capacitively coupling said first transmitter strip to said first section of said first receiver strip at predetermined positions and said second section of said second receiver strip at other predetermined positions, said second mobile plate being disposed proximate to and alternatively capacitively coupling said second transmitter strip to said first section of said second receiver strip at predetermined positions and said second section of said first receiver strip at other predetermined positions, said mobile plate reversing the capacitive connection between the transmitter and receiver strips as said mobile plate passes said indicator point; and
   (f) indicator means connected to said oscillator means and said differential amplifier to detect the movement of said mobile plates across said indicator point.

2. The position indicating device as claimed in claim 1 further including at least third and fourth receiver strips disposed proximate to said first transmitter strip at predetermined positions and disposed proximate said second transmitter strip at other predetermined positions to form a second indicator point.

3. The position indicating device as claimed in claim 1 wherein said differential amplifier includes a current coupled input to thereby reduce the indicator error due to stray capacitance.

4. The position indicating device as claimed in claim 1 wherein said transmitter strips and said receiver strips are formed as printed circuit elements disposed on opposed sides of a circuit board.

* * * * *